Nov. 12, 1935.   O. J. LAMING   2,021,124

BRAKE

Filed Sept. 7, 1933

INVENTOR
Omar Jelona Laming
BY
ATTORNEY

Patented Nov. 12, 1935

2,021,124

UNITED STATES PATENT OFFICE 2,021,124

BRAKE

Omar Jelona Laming, Morton, Ontario, Canada, assignor of one-third to George R. Church, Crosby, Ontario, Canada, and one-third to Preston B. Laming, Morton, Ontario, Canada Application September 7, 1933, Serial No. 688,489

3 Claims. (Cl. 188—71)

This invention relates to improvements in a brake and appertains particularly to one adapted for use with automobiles and other like vehicles.

The principal object of the invention is the provision of a brake having a clutch-like action wherein a non-rotatable disk is moved into lateral engagement with a rotatable disk that revolves with a wheel.

A further object of the invention is the provision of a brake wherein a non-rotatable disk or ring is arranged concentric with the axle and moved longitudinally thereof into lateral engagement with a rotatable wheel carrying disk.

A further object of the invention is the provision of a brake employing a rotatable cam surrounding the axle housing to move a non-rotatable braking ring into lateral and frictional engagement with a rotatable ring mounted on and turning with the wheel.

A still further object of the invention is the provision of a brake of the nature and for the purpose described that is characterized by structural simplicity, durability and ease of operation wherein the several parts are readily accessible for inspection and repair and that being capable of production at a reasonable cost, is thereby rendered commercially desirable.

To the accomplishment of these and related objects as shall become apparent as the description proceeds, the invention resides in the construction, combination and arrangement of parts as shall be hereinafter more fully described, illustrated in the accompanying drawing and pointed out in the claims hereunto appended.

The invention will be best understood and can be more clearly described when reference is had to the drawing forming a part of this disclosure, wherein like characters indicate like parts throughout the several views.

In the drawing:—

Figure 1:
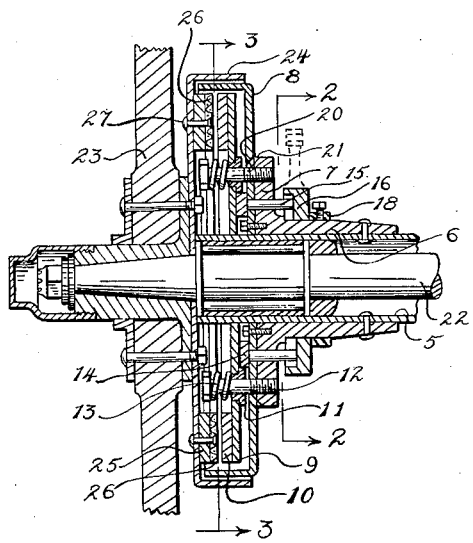
Figure 1 is a vertical longitudinal section of the brake as applied to wheel and axle housing.
Figure 2:
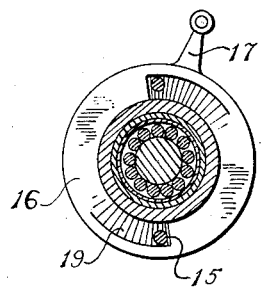
Figure 2 is a transverse vertical section as taken on the line 2—2 of Figure 1, showing the operating cam.
Figure 4:
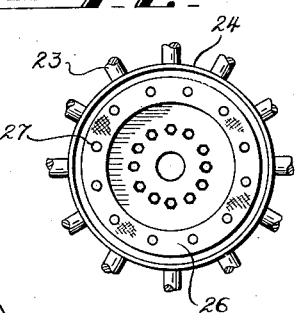
Figure 4 is a half size elevation of the inside of the wheel carried portion of the brake.
Figure 3:
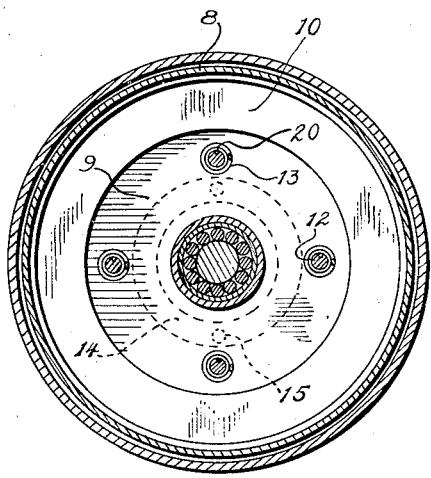
Figure 3 is another vertical transverse section as taken on the line 3—3 of Figure 1, looking in the direction indicated by the arrows.

Referring more in detail to the drawing, it will be noted that near the outer end of the axle housing 5 a sleeve 6 is mounted having its outer end exteriorly flanged as at 7 to carry the inner and fixed brake drum 8. A non-rotatable disk 9 is arranged within this inner brake drum 8 and provided on its outer face with a peripheral ring 10 that serves as a braking shoe. The disk 9 itself is provided with a number of circumferentially spaced bushings 11 that are threaded therein inside the brake shoe 10. This disk 9 slides longitudinally of the axle housing 5 on bolts 12 extended through the bushings 11 and the inner brake drum 8 and threaded in the flanged end 7 of the sleeve 6. Coil springs 13 are compressed on these bolts between the heads thereof and the bushings 11 in the plate 9, serving to hold the disk 9 and brake shoe ring 10 retracted in inoperative position.

The reinforcing band 14 is mounted on the back of the disk 9 concentric with the axle housing 5 but within the row of circumferentially spaced bolts 12. Behind this band a pair of diametrically opposite openings occur in the inner brake drum 8 and flanged end 7 of the sleeve 6 to accommodate a pair of pins 15 whose outer ends bear against the reinforcing band 14 while their inner ends projecting beyond the flange 7 engage the operating face of a rotatable cam ring 16 having a radially extending lever arm 17 and that is held against longitudinal displacement on the sleeve 6 by a confining collar 18. The operating face of this cam ring 16, that is adapted to turn through an angle up to 90°, includes two diametrically opposite laterally receding seats 19 in the deepest end of which the pins 15 normally seat so that it will be apparent that on the turning of this cam ring 16 the pins 15 are forced outwardly against the reinforcing band 14 pressing the disk 9 and brake shoe ring 10 outwards against the action of the compressed coil springs 13 on the supporting bolts 12. In view of the friction between the bolts 12 and the bushings 13 in the disk 9 that would normally result, these bolts are grooved longitudinally as indicated at 20 and lubricating inlets 21 come through the inner brake drum 8 into communication with them.

On the outer end of the axle 22 that extends through the axle housing 5, a conventional wheel 23 is positioned against whose inner face the outer brake drum housing 24 is mounted. This brake drum housing, circumferentially flanged in the usual way, overlies or telescopes over the flange of the inner brake drum housing 8, thereby completely enclosing the contained parts of the brake. An annular band 25 is disposed against the inner face of the outer brake drum housing 24 being of substantially the same size as and designed to confront the peripheral ring 10 on the non-rotatable disk 9. The inner face of this annular band 25 is suitably faced with a ring of brake lining 26, both the brake lining and the annular band being attached to the outer brake drum housing 24 by spaced rivets or other fastening means 27.

In operation the brakes may be applied manually or by a foot pedal connecting in any suitable manner with the radial arm 17 of the cam ring 16 whose rotative movement presses the brake shoe ring 10 on the disk 9 into frictional engagement with the brake lining faced outer brake drum housing 24, that slowly or quickly as desired, brings the turning wheel to rest.

On release of the brake operating means, the operating cam ring is returned to inoperative position allowing the pins to retract into the deeper part of the cam seats and the brake shoe ring and its supporting disk to retire from the brake lining faced rotatable drum housing under the action of the compressed coil springs on the supporting bolts.

From the foregoing description taken in connection with the accompanying drawing, it will be manifest that a brake is provided that will fulfill all the necessary requirements of such a device, but as many changes could be made in the above description and many apparently widely different embodiments of the invention may be constructed within the scope of the appended claims without departing from the spirit or scope thereof, it is intended that all matters contained in the said accompanying specification and drawing shall be interpreted as illustrative and not in a limitative or restrictive sense.

Having thus described the invention, what is claimed is:—

1. A brake comprising in combination with an axle, axle housing and wheel; a rotatable brake drum housing mounted on the wheel; a flanged sleeve on the axle housing near the end thereof; a non-rotatable brake drum housing carried by said flanged sleeve and telescoping within said rotatable brake drum housing; a non-rotatable plate within said non-rotatable brake drum housing; a peripheral brake shoe ring on the outer side of said plate; bolts extended through said plate, said inner brake drum housing and into said flanged sleeve on which said plate is slidably mounted; coil springs between the heads of said bolts and said plate normally holding the latter in retracted position; a rotatable cam mounted on said sleeve; and longitudinally sliding pins extended through the flange of said sleeve and said non-rotatable brake drum housing and having their opposite ends bearing against said rotatable cam and said plate, respectively.

2. A brake comprising in combination with an axle, axle housing and wheel; a rotatable brake drum housing mounted on the wheel; a sleeve on the axle housing near the end thereof; whose outer end is flanged outwardly; a non-rotatable brake drum housing carried by said flanged sleeve; a non-rotatable plate in said non-rotatable brake drum housing; a peripheral brake shoe ring on the outer side of said plate; circumferentially spaced bushings in said plate inside of said ring; bolts extended through said bushings and said non-rotatable brake drum housing and threaded in the flange of said sleeve; coil springs compressed between the heads of said bolts and said plate, normally holding the latter in retracted position; means for lubricating said bushing carrying bolts; a reinforcing band on the inner side of said plate; registering openings through said non-rotatable brake drum housing and the flanged end of said sleeve in alignment with said band; a rotatable brake operating cam on said sleeve; and means extended through said registering openings for connecting said cam and said reinforcing band on said plate.

3. A brake comprising in combination with an axle, axle housing and wheel; a rotatable brake drum housing mounted on the wheel; an annular band on the inner side of said housing; a brake lining facing therefor; a sleeve on said axle housing near the end thereof; an exterior flange on the outer end of said sleeve; a non-rotatable drum housing carried by said flange; a non-rotatable plate in said non-rotatable brake drum housing; a peripheral brake shoe ring on the outer side of said plate confronting said annular brake lining facing; a plurality of circumferentially spaced bushings in said plate; bolts extended through said bushings and said non-rotatable brake drum housing and threaded in said flange of said sleeve; means for lubricating said bushing carrying bolts; coil springs compressed between the heads of said bolts and said plate; a reinforcing band on the inner side of said plate within the row of said circumferentially spaced bushings; diametrically opposite openings through said non-rotatable brake drum housing and said flanged end of said sleeve in alignment with said reinforcing band; pins carried in said openings; a rotatable cam on said sleeve having laterally tapered seats for the accommodation of the adjacent ends of said pins; and a confining collar on said sleeve holding said rotatable cam against lateral displacement.

OMAR JELONA LAMING. [L. S.]